United States Patent
Chugunov et al.

(10) Patent No.: US 11,657,523 B2
(45) Date of Patent: May 23, 2023

(54) MICROLENS AMPLITUDE MASKS FOR FLYING PIXEL REMOVAL IN TIME-OF-FLIGHT IMAGING

(71) Applicants: THE TRUSTEES OF PRINCETON UNIVERSITY, Princeton, NJ (US); KING ABDULLAH UNIVERSITY OF SCIENCE AND TECHNOLOGY, Thuwal (SA)

(72) Inventors: Ilya Chugunov, Princeton, NJ (US); Seung-Hwan Baek, Princeton, NJ (US); Qiang Fu, Thuwal (SA); Wolfgang Heidrich, Thuwal (SA); Felix Heide, Princeton, NJ (US)

(73) Assignees: The Trustees of Princeton University, Princeton, NJ (US); King Abdullah University of Science and Technology, Thuwal (SA)

( * ) Notice: Subject to any disclaimer, the term of this patent is extended or adjusted under 35 U.S.C. 154(b) by 0 days.

(21) Appl. No.: 17/915,536

(22) PCT Filed: Mar. 17, 2022

(86) PCT No.: PCT/IB2022/052448
§ 371 (c)(1),
(2) Date: Sep. 29, 2022

(87) PCT Pub. No.: WO2022/195537
PCT Pub. Date: Sep. 22, 2022

(65) Prior Publication Data
US 2023/0118593 A1    Apr. 20, 2023

Related U.S. Application Data
(60) Provisional application No. 63/162,336, filed on Mar. 17, 2021.

(51) Int. Cl.
*G06K 9/00* (2022.01)
*G06T 7/50* (2017.01)
(Continued)

(52) U.S. Cl.
CPC .............. *G06T 7/50* (2017.01); *G01S 7/4816* (2013.01); *G01S 7/4912* (2013.01); *G01S 17/894* (2020.01); *G06T 2207/10028* (2013.01)

(58) Field of Classification Search
CPC ............. G06T 7/50; G06T 2207/10028; G01S 7/4816; G01S 7/4912; G01S 17/894
See application file for complete search history.

(56) References Cited

U.S. PATENT DOCUMENTS 9,729,857 B2 *  8/2017  Nisenzon ............... H04N 13/25
9,858,673 B2 *  1/2018  Ciurea .................... G06T 7/557
(Continued)

FOREIGN PATENT DOCUMENTS

CA    3038038 A1 *  3/2018    ............. G01J 1/029
EP    2487504 A1 *  8/2012    ........... G01S 17/003
(Continued)

OTHER PUBLICATIONS

DeepToF: Off-the-Shelf Real-Time Correction of Multipath Interference in Time-of-Flight Imaging, Julio Marco et al., ACM, 2017, pp. 219-1-219-12 (Year: 2017).*

(Continued)

*Primary Examiner* — Jayesh A Patel
(74) *Attorney, Agent, or Firm* — Ajay A. Jagtiani; Miles & Stockbridge P.C.

(57) ABSTRACT

The microlens amplitude masks for flying pixel removal in time-of-flight imaging includes systems, devices, methods, and instructions for image depth determination, including receiving an image, adding noise to the image, determining a set of correlation images, each correlation image having a (Continued)

varying phase offset, for each pixel of the image, generating a masked pixel by applying a mask array, and for each masked pixel, determining the depth of the masked pixel to generate a depth map for the image on a per pixel basis.

11 Claims, 10 Drawing Sheets

(51) Int. Cl.
  *G01S 17/894* (2020.01)
  *G01S 7/4912* (2020.01)
  *G01S 7/481* (2006.01)

(56) References Cited

U.S. PATENT DOCUMENTS

| | | | | |
|---|---|---|---|---|
| 11,272,157 | B2* | 3/2022 | Le Dortz | G01S 17/894 |
| 2012/0224029 | A1* | 9/2012 | Pavani | H04N 13/271 |
| | | | | 348/47 |
| 2013/0177236 | A1* | 7/2013 | Kim | G01S 7/487 |
| | | | | 382/154 |
| 2014/0185921 | A1* | 7/2014 | Choi | G06T 5/20 |
| | | | | 382/154 |
| 2015/0092017 | A1* | 4/2015 | Kang | G06T 5/002 |
| | | | | 348/46 |
| 2015/0192510 | A1* | 7/2015 | Piestun | G01N 15/1456 |
| | | | | 702/152 |
| 2016/0239725 | A1* | 8/2016 | Liu | G06T 5/00 |
| 2016/0357008 | A1* | 12/2016 | Li | G02B 21/0008 |
| 2018/0041759 | A1* | 2/2018 | Froehlich | H04N 19/182 |
| 2018/0284280 | A1* | 10/2018 | Eichenholz | G01S 7/4816 |
| 2019/0302246 | A1* | 10/2019 | Donovan | G01S 17/08 |
| 2019/0331775 | A1* | 10/2019 | Song | G01S 7/4863 |
| 2020/0120299 | A1* | 4/2020 | Li | H04N 23/671 |
| 2020/0167942 | A1* | 5/2020 | Plank | G01S 17/36 |
| 2020/0280659 | A1* | 9/2020 | Galor Gluskin | H04N 25/533 |
| 2021/0035303 | A1* | 2/2021 | Bleyer | G06T 7/11 |
| 2021/0067705 | A1* | 3/2021 | Galor Gluskin | G01S 17/42 |
| 2021/0341585 | A1* | 11/2021 | Moebius | G01S 17/02 |
| 2021/0383559 | A1* | 12/2021 | Doutre | G01S 7/4863 |
| 2022/0130060 | A1* | 4/2022 | Aßmann | G01S 17/894 |

FOREIGN PATENT DOCUMENTS

| | | | | |
|---|---|---|---|---|
| EP | 2547095 | A1 * | 1/2013 | G01S 17/023 |
| WO | WO-2016140954 | A1 * | 9/2016 | G06T 5/40 |
| WO | WO-2016156308 | A1 * | 10/2016 | G01S 17/36 |
| WO | 2021/004263 | A1 | 1/2021 | |
| WO | WO-2021004263 | A1 * | 1/2021 | G01S 17/89 |
| WO | 2021/033191 | A1 | 2/2021 | |
| WO | WO-2021033191 | A1 * | 2/2021 | G06K 9/00288 |

OTHER PUBLICATIONS

Time-of-Flight Camera—An Introduction, Larry Li, Texas Instruments, 2014, pp. 1-10 (Year: 2014).*
Temporal Noise Analysis and Measurements of CMOS Active Pixel Sensor Operating in Time Domain, Fernando de Souza Campos et al., IEEE, 2013, pp. 1-5 (Year: 2013).*
A Global-Shutter Centroiding Measurement CMOS Image Sensor With Star Region SNR Improvement for Star Trackers, Xinyuan Qian et al., IEEE, 2016, pp. 1555-1562 (Year: 2016).*
Mask-ToF: Learning Microlens Masks for Flying Pixel correction in Time-0f-Flight Imaging, Hya Chugunov et al, CVPR 2021, pp. 9116-9126 (Year: 2021).*
Chugunov et al., "Mask-ToF: Learning Microlens Masks for Flying Pixel Correction in Time-of-Flight Imaging", IEEE/CVF Conference on Computer Vision and Pattern Recognition, pp. 9116-9126, Jun. 20, 2021.
Search Report and Written Opinion received in parent International Application No. PCT/IB2022/052448 dated Jun. 14, 2022.

* cited by examiner

MICROLENS AMPLITUDE MASKS FOR FLYING PIXEL REMOVAL IN TIME-OF-FLIGHT IMAGING

This application is a 371 application of International Application No. PCT/IB2022/052448, which has an International Filing Date of Mar. 17, 2022, which claims the benefit of U.S. Provisional Patent Application No. 63/162,336, filed on Mar. 17, 2021, both of which are incorporated herein by reference in their entirety.

FEDERALLY SPONSORED RESEARCH

This invention was made with government support under Grant No. IIS-2047359 awarded by the National Science Foundation (NSF). The United States Government has certain rights in the invention.

BACKGROUND OF THE INVENTION

Field of the Invention

The embodiments of the present invention generally relate to image processing, and more particularly, toward techniques for three-dimensional (3D) image processing and depth determination.

Discussion of the Related Art

At present, typical time-of-flight (ToF) depth capture cameras collect light incident to a lens, focus the incident light onto a sensor (i.e., along the sensor plane), and measure an output at each pixel of a pixel array sensor (e.g., a complementary metal-oxide-semiconductor ("CMOS") type sensor). In some instances, one or more individual pixels receive a mixed-light signal. Depending on the subject matter of the image, the mixed-light may originate from multiple object surfaces at varying depths.

ToF imaging can be further categorized into direct and indirect techniques. Direct ToF devices such as light detection and ranging ("LiDAR") send out pulses of light, scanning over a scene and directly measuring their round-trip time using photodiodes or photon detectors. While accurate and long-ranged, these systems can produce only a few spatial measurements at a time, resulting in sparse depth maps. Furthermore, their specialized detectors are orders of magnitude more expensive than conventional CMOS sensors.

Amplitude modulated continuous wave ("AMCW") ToF imaging is a type of indirect ToF. AMCW devices instead flood the whole scene with periodically modulated light and infer depth from phase differences between captures (i.e., using a plurality of correlation images at varying phase offsets). These captures can be acquired with a standard CMOS sensor, making AMCW ToF cameras an affordable solution for dense depth measurement.

In current ToF imaging applications, both direct ToF (e.g., LiDAR) and indirect ToF (e.g., AMCW), the resultant estimated depth for a given pixel is incorrect when mixed-light is received. A so-called "flying pixel" has an estimated depth that is between the objects of varying depths. As neighboring pixels also included mixed-light, neighboring pixels cannot be reliably used to disambiguate the flying pixel artifact.

FIG. 1 illustrates a correlation imager system 100 according to the related art. As illustrated in FIG. 1, ToF camera 110 illuminates (depicted as illumination 111) a target 120 with continuously modulated light. The light is reflected by target 120 (depicted as reflected signal 112), which results in an accrued depth-dependent phase shift 113. The light is collected on camera sensor 114, converted to an electrical signal 115, and correlated with an on-board reference signal 116 to produce a time-of-flight correlation measurement 117 and one or more correlation images.

FIG. 2 illustrates the use of multiple correlation images to calculate depth according to the related art. As illustrated in FIG. 2, by collecting multiple (e.g., four) correlation images 211A, 211B, 211C, 211D with varying phase offsets (e.g., 0, π, π/2, 3π/2, respectively), the phase of the reflected light can be determined. Here, the correlation values C at each of the varying phase offsets can be used to extract the measured signal true phase $\phi$ according to:

$$\phi = \arctan\left(\frac{C(\pi) - C(\pi/2)}{C(0) - C(3\pi/2)}\right) + 2\pi n, \qquad \text{Eq. (1)}$$

where $2\pi n$ is a phase ambiguity for certain depths. For each pixel, the phase $\phi$ is calculated. Subsequently, a phase map 220 of the correlation images can be converted into a depth map 230. For each pixel, depth z is calculated according to:

$$z = \phi c/4\pi\omega, \qquad \text{Eq. (2)}$$

where c is the speed of light and w is a modulation frequency of the amplitude modulated light that is used for illumination (depicted as illumination 111 in FIG. 1).

However, the related art techniques are subject to various limitations and drawbacks. For example, indirect ToF methods are still subject to fundamental limitations of the sensing process including noise from ambient light, photon shot, phase wrapping, multipath interference (MPI), and flying pixels.

FIG. 3 illustrates the reflection of a mixed-light signal according to the related art. As illustrated in FIG. 3, foreground object 221 and background object 222 are illuminated (depicted as illumination 111). ToF camera lens 218 receives reflected light from both objects through aperture 219, and focuses the light to produce foreground signal 231 and background signal 232 on pixel 220 of sensor 114. Mixed light including foreground signal 231 and background signal 232 are used to calculate the depth of the target object (e.g., either foreground object 221 or background object 222). However, the mixed light produces a mixed depth measurement, and the calculated depth does not accurately reflect the depth of the target object and a flying pixel 240 is produced.

Flying pixels, such as flying pixel 240, frequently occur around or near depth edges, where light paths from both an object and its background or foreground are integrated over the aperture.

One common solution to reduce flying pixel count is to narrow the camera aperture. However, use of a narrow aperture also reduces overall light throughput and increases the system's susceptibility to noise. While a narrower aperture could reduce the effects of flying pixels, it is not light efficient, and leads to high noise susceptibility in the measurements.

Unfortunately, such a masking approach (i.e., reducing aperture size) significantly lowers the signal-to-noise ratio ("SNR"). Thus, there exists a strict SNR verses flying pixel tradeoff for typical ToF depth cameras.

Accordingly, the inventors have developed mask-ToF learning microlens masks for flying pixel correction in ToF imaging to overcome the limitations and drawbacks of the related art devices.

SUMMARY

Accordingly, the present invention is directed to microlens amplitude masks for flying pixel removal in time-of-flight imaging that substantially obviates one or more problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

As discussed above, flying pixels are pervasive artifacts that occur at object boundaries, where background and foreground light mix to produce erroneous measurements that can negatively impact downstream 3D vision tasks, such as depth determination. The embodiments of the present invention generate a microlens-level occlusion mask pattern which modulates the selection of foreground and background light on a per-pixel basis.

When configured in an end-to-end fashion with a depth refinement network, the embodiments of the present invention are able to effectively decode these modulated measurements to produce high fidelity depth reconstructions with significantly reduced flying pixel counts.

To achieve these and other advantages and in accordance with the purpose of the present invention, as embodied and broadly described, the microlens amplitude masks for flying pixel removal in time-of-flight imaging includes systems, devices, methods, and instructions for image depth determination, including receiving an image, adding noise to the image, determining a set of correlation images, each correlation image having a varying phase offset, for each pixel of the image, generating a masked pixel by applying a mask array, and for each masked pixel, determining the depth of the masked pixel to generate a depth map for the image on a per pixel basis.

In another aspect, the microlens amplitude masks for flying pixel removal in time-of-flight imaging includes systems, devices, methods, and instructions for image depth determination, including a time-of-flight system for image depth determination, the system a lens configured to receive incident light, and a light sensor having a plurality of pixels, the light sensor configured to receive the incident light through a plurality of masks, each pixel corresponding to a respective mask that selectively blocks incident light paths to provide a differentiable apertures for neighboring pixels.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Reference will now be made in detail to the embodiments of the present invention, examples of which are illustrated in the accompanying drawings. Wherever possible, like reference numbers will be used for like elements.

Flying pixels are pervasive artifacts in ToF imaging which occur at object discontinuities, where both foreground and background light signal is integrated over the camera aperture. The light mixes at a sensor pixel to produce erroneous depth estimates, which then adversely affect downstream 3D vision tasks, such as depth determination. The embodiments of the present invention introduce a custom-shaped sub-aperture for each sensor pixel. For example, the embodiments of the present invention generate a microlens-level occlusion mask which effectively generates a custom-shaped sub-aperture for each sensor pixel. By customizing the aperture for each sensor pixel, the effects of flying pixels are significantly reduced.

Figure 4:
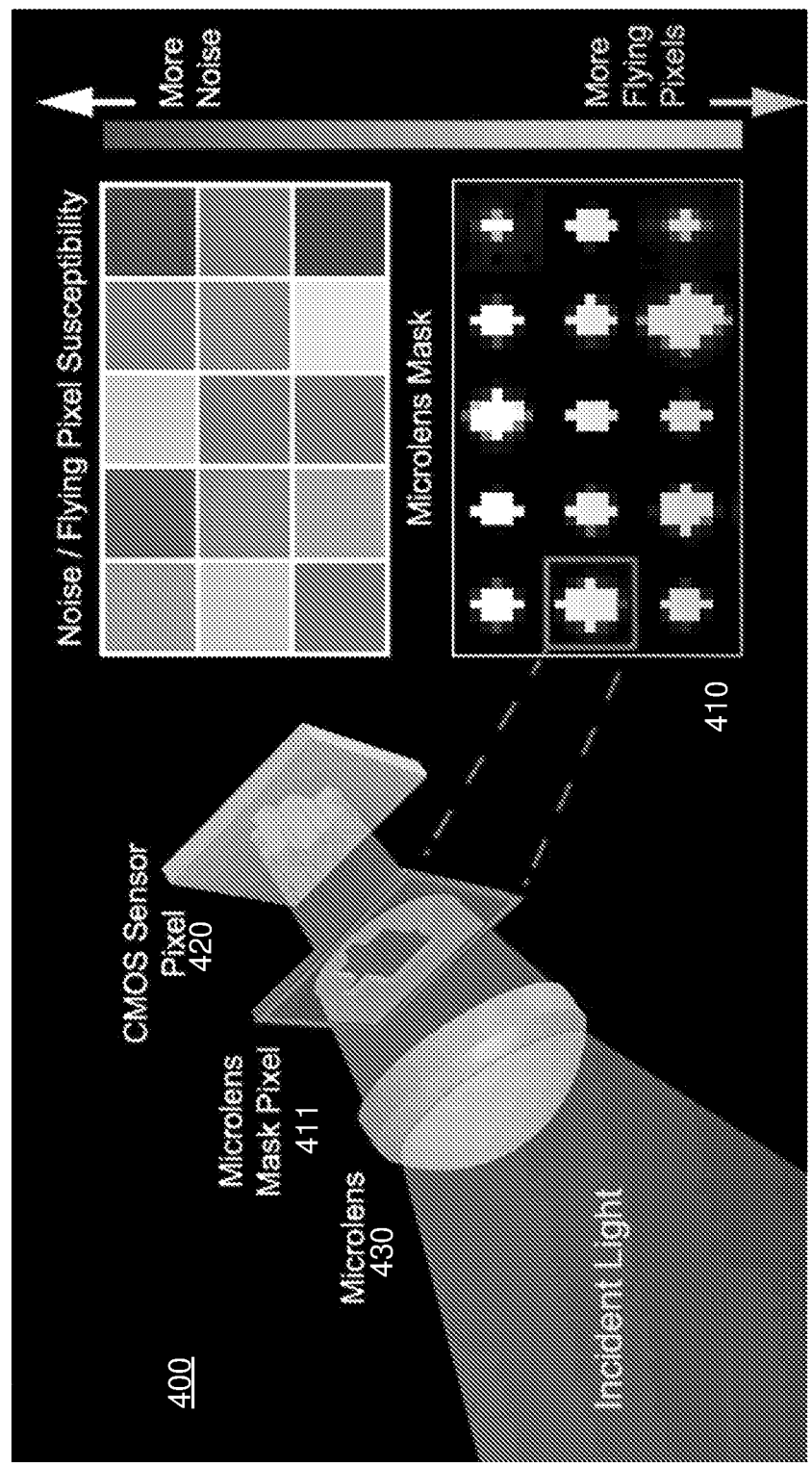
FIG. 4 illustrates a camera system having a microlens mask according to an example embodiment of the present invention.

FIG. 4 illustrates a camera system 400 having a microlens mask 411 according to an example embodiment of the present invention.

Microlens mask 411, selected from a plurality microlens mask patterns 410, is disposed between sensor (e.g., CMOS sensor pixel 420) and microlens 430. The aperture of microlens mask 411 is configured to selectively block incident light paths to enable a custom aperture for each pixel. This modulates the selection of foreground and background light mixtures on a per-pixel basis and further encodes scene geometric information directly into the ToF measurements. Thus, microlens mask 411 provides spatially varying susceptibility to noise and flying pixels, and is used to de-noise and reduce the occurrence of flying pixels. In addition, use of microlens mask 411, with its learned mask pattern (as described below), further enables measurements from neighboring pixels with different effective apertures to provide additional data to accurately identify and rectify flying pixels.

For example, a mask 411 may be photolithographically disposed on each pixel of sensor 420 during fabrication of the sensor. A custom optical relay system was used to validate the mask pattern. In another example, the mask 411 can be fabricated directly on each pixel of sensor 420. Although camera system 400 depicts a microlens 430, microlens mask 411, and pixel of sensor 420, the embodiments are not so limited. A variety of lens sizes and types can be used, a mask array having a plurality of masks 411 can be used, and a variety of sensor types can be used.

Figure 5A:
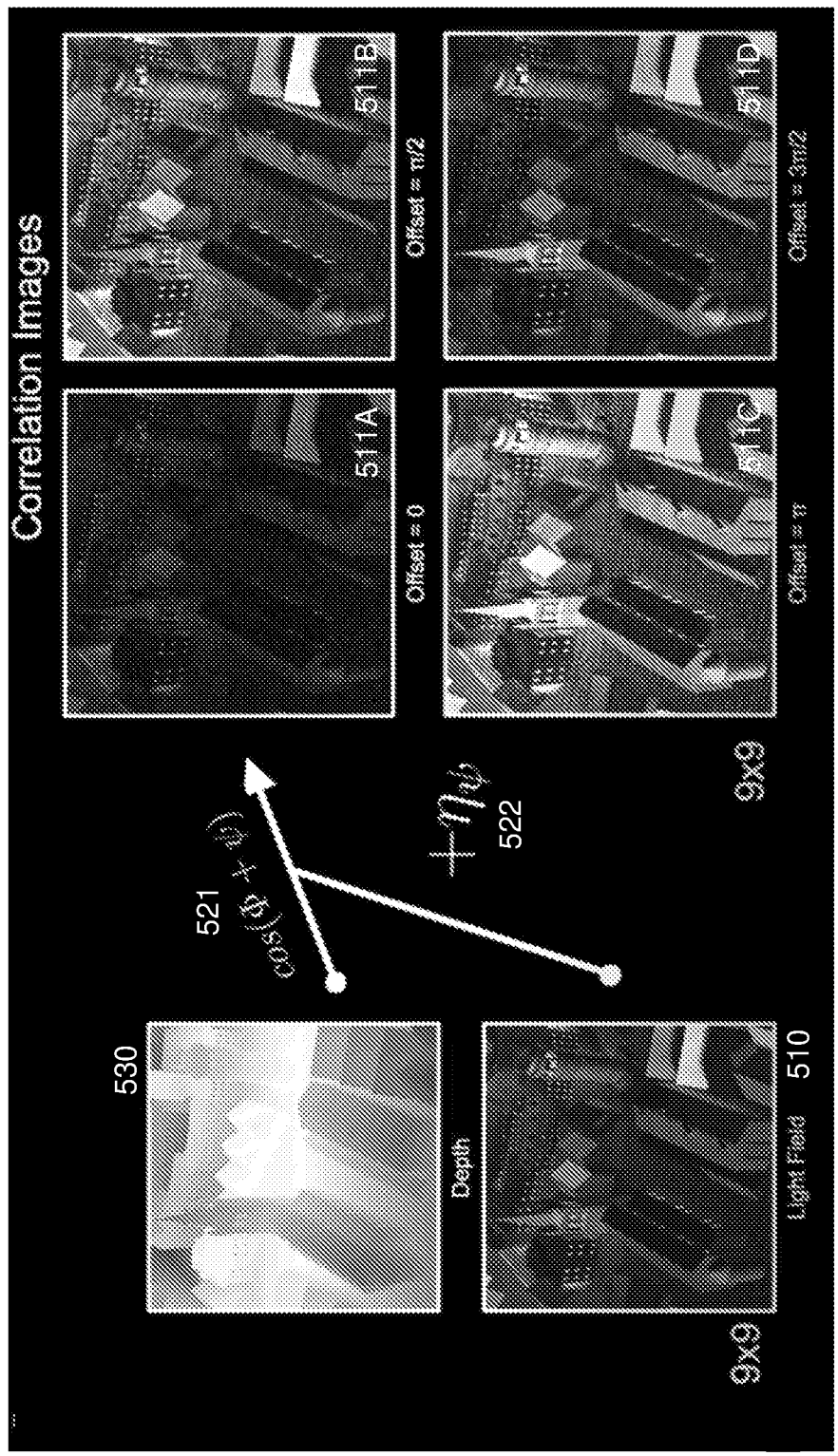
FIGS. 5A and 5B illustrate the data used for generation of a mask pattern according to an example embodiment of the present invention.
Figure 5B:
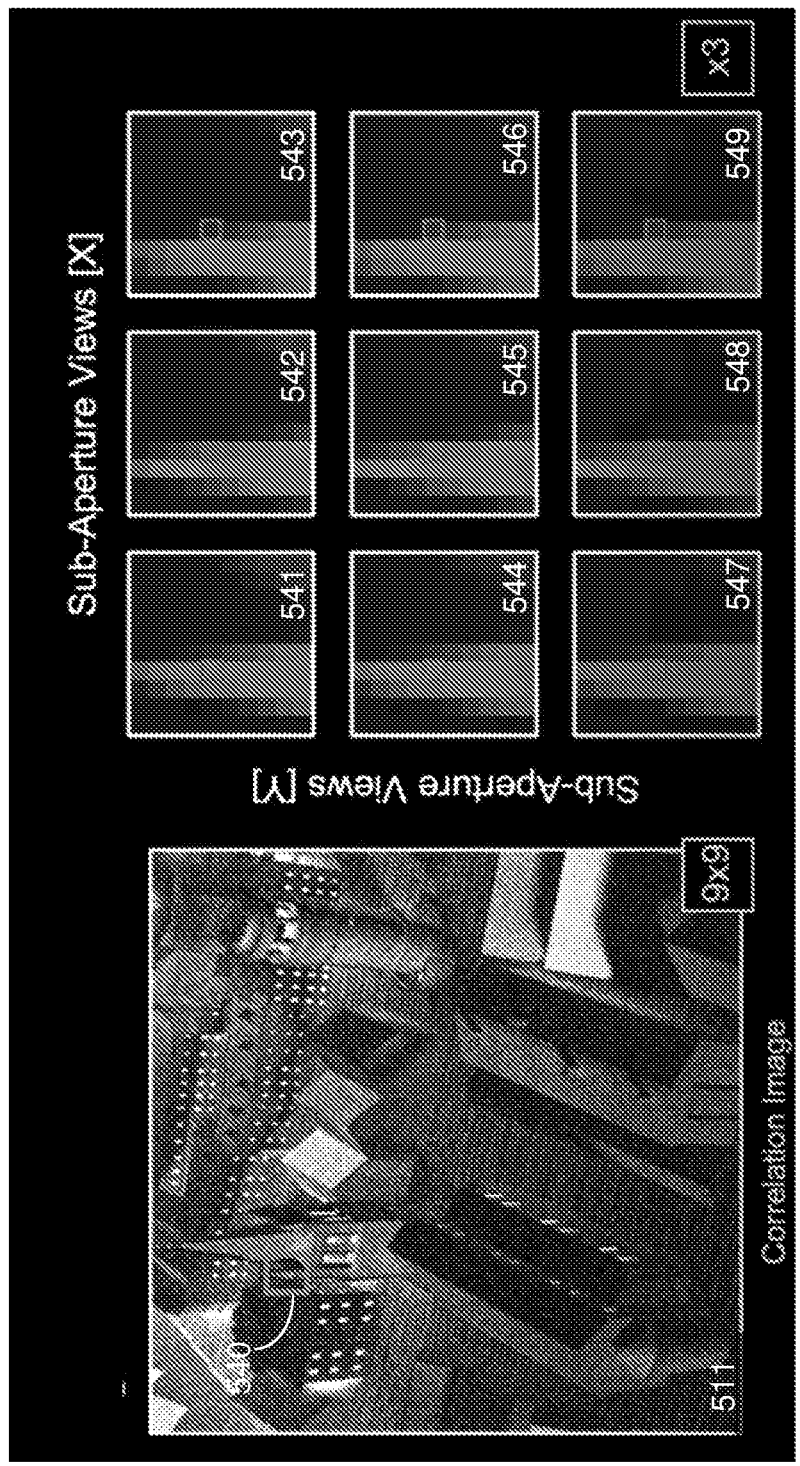

FIGS. 5A and 5B illustrate the data used for generation of a mask pattern according to an example embodiment of the present invention.

As illustrated in FIG. 5A, the generation of a mask is driven by an image having a set of light field data 510 that includes scene view data from multiple viewing angles. Using as input a set of light field data 510, a set of correlation values 521 (as a function of cos(φ+ψ), where φ is the phase and ψ is the phase offset) produce a set of correlation images 511A, 511B, 511C, 511D that are determined for each sub-aperture view at varying phase offsets (e.g., 0, π, π/2, 3π/2, respectively). Correlation values can include weights to encode depth data of depth map 530. Typically, depth data of depth map 530 is determined using ToF measurements.

Simulated noise 522 is added to light field data 510 or the set of correlation images 511A, 511B, 511C, 511D at varying phase offsets (e.g., 0, π, π/2, 3π/2, respectively). For example, simulated noise 522 can include noise according to a Poisson distribution or a Skellam distribution that approximates Gaussian noise. The introduction of noise can be to simulate system and/or environmental perturbations.

As illustrated in FIG. 5B, to determine the microlens mask, ToF data of correlation image 511 with sub-aperture views 541-549 are used. Sub-aperture views 541-549 correspond to a subsection of a respective correlation image, such as a subsection or pixel group 540. In addition, each of sub-aperture views 541-549 corresponds to respective viewing angle data contained in light field data 510.

As there are no available datasets, the set of light field data 510 of correlation image 511 with depth map 530 are used to determine ToF amplitude measurements. In some embodiments, the time of flight measurements are decoded or otherwise extracted from the set of light field data 510 to determine initial depth estimate for depth map 530.

Figure 6:
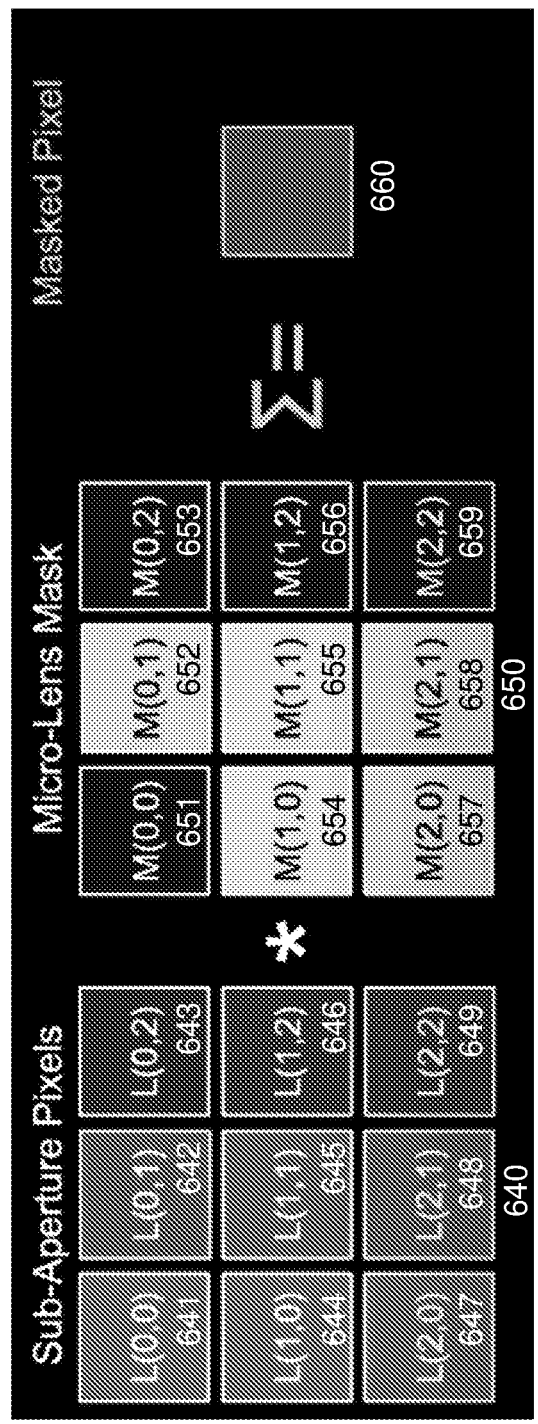
FIG. 6 illustrates the generation of a masked pixel according to an example embodiment of the present invention.

FIG. 6 illustrates the generation of a masked pixel according to an example embodiment of the present invention.

By multiplication of a set of sub-aperture pixels 640 (e.g., including sub-aperture pixels 641-649) by a mask array 650 (e.g., including a set of micro-lens masks 651-659) and summing the results on a per pixel basis, a masked pixel 660 is produced. Here, sub-aperture pixels 640 are weighted according to a mask array 650. As discussed above, simulated noise can be added, and the weighted sub-aperture pixels are combined with the simulated noise to produce an initial depth estimate on a per pixel basis.

Figure 7:
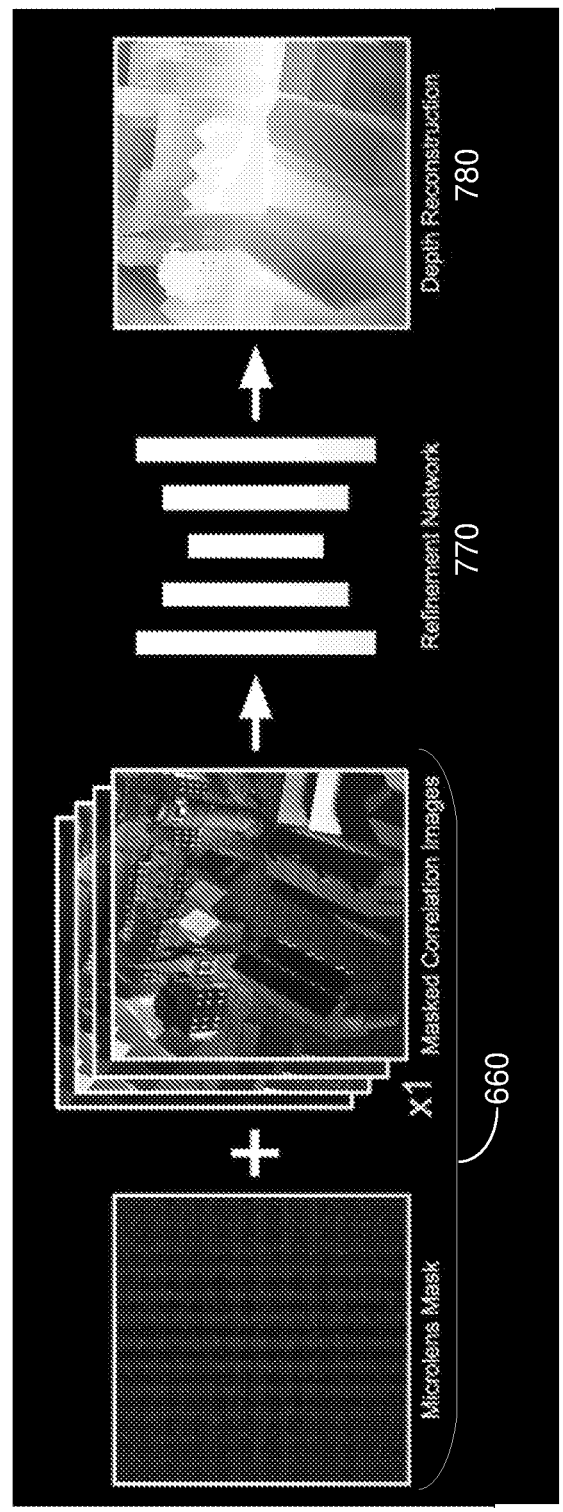
FIG. 7 illustrates the generation of a decoded depth construction according to an example embodiment of the present invention.

FIG. 7 illustrates the generation of a decoded depth construction according to an example embodiment of the present invention.

For a given masked correlation image, each generated masked pixel 660 (e.g., generated using is masking process as illustrated in FIG. 6) is processed by a convolution refinement network 770 to output a decoded and refined depth reconstruction map 780. Initial depth estimates are input as masked pixels 660 to convolution refinement network 770 that decodes the spatially varying pixel measurements to produce refined (e.g., more accurate, more granular, etc.) depth estimates as refined depth reconstruction map 780.

In some embodiments, an estimated depth map can be generated from multiple (e.g., four) masked correlation images. The depth can be estimated using Eq. (1) and Eq. (2), or alternatively, other depth estimation techniques can be used, such as the discrete Fourier transform.

Convolution refinement network 770 is a residual encoder-decoder model, implemented using a memory and a graphical processing unit ("GPU") or other processor, that utilizes an initial depth estimate and mask information as input to refined depth reconstruction map 780. For example, refined depth reconstruction map 780 can be calculated according to $$\hat{D}^* = R(P(C), M) = \max(0, \hat{D} + \hat{D}^R),\qquad \text{Eq. (3)}$$

where $\hat{D}^*$ is the refined depth map, R is the convolution refinement network, P(C) is the initial depth estimate, M is the mask, $\hat{D}$ is the initial depth estimate, and $\hat{D}^R$ is the refined residual depth which when added to $\hat{D}$ serves to correct the now spatially multiplexed effects of noise and flying pixels.

Eq. (3) in contrast to Eq. (1) and Eq. (2) introduces the use of an initial depth calculation. In addition, convolution refinement network 770 does not generate depth from phase, and the processing and computational needs of convolution refinement network 770 are substantially reduced as compared to a conventional deep reconstruction network. As a result, convolution refinement network 770 quickly determines high level depth and mask features, as well as determines other image information where raw phase data might significantly differ from a training set. The sequential depth estimation and refinement approach also enables calibration procedures implemented by the sensor manufacturers. Real depth data can be supplied to convolution refinement network 770 without having to retrain and learn calibration offsets.

Thus, the encoder-decoder model of convolution refinement network 770 is configured to aggregate the spatial information and utilize mask structural cues to produce refined depth estimates. The errors between initial depth estimates and refined depth estimates can be used to improve mask patterns.

Figure 8:
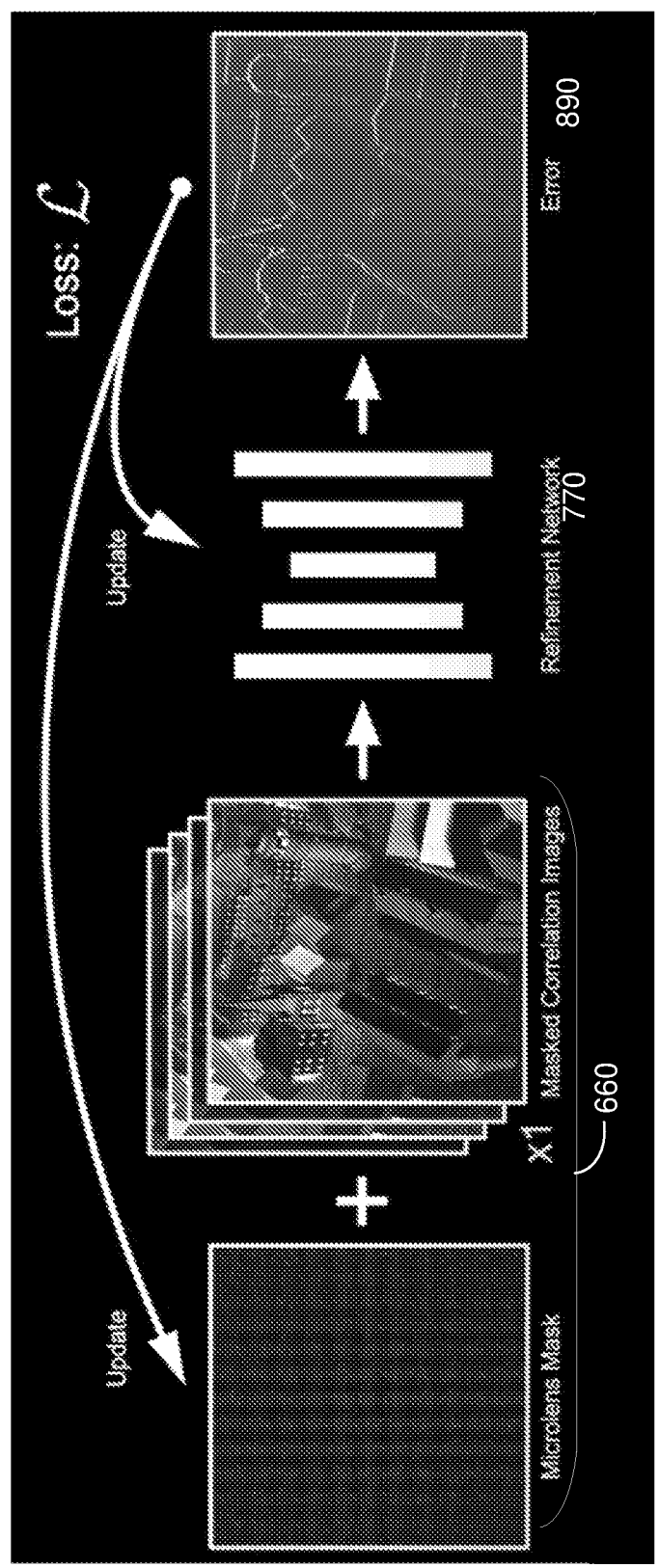
FIG. 8 illustrates the updating of a mask pattern according to an example embodiment of the present invention.

FIG. 8 illustrates the updating of a mask pattern according to an example embodiment of the present invention.

At convolution refinement network 770, errors in depth calculations (e.g., between the initial depth and refined depth) are calculated. Calculating the errors with respect to the light field depth, the errors can be used to improve convolution refinement network 770 and mask array 650 (e.g., as illustrated in FIG. 6). In this way, starting at an initial mask, the embodiments can simultaneously determine an encoding or otherwise update a mask pattern and decoding network weights. The updated mask pattern can be applied on (e.g., photolithographically) each pixel of a sensor (e.g., sensor 420) during fabrication of the sensor.

Figure 1:
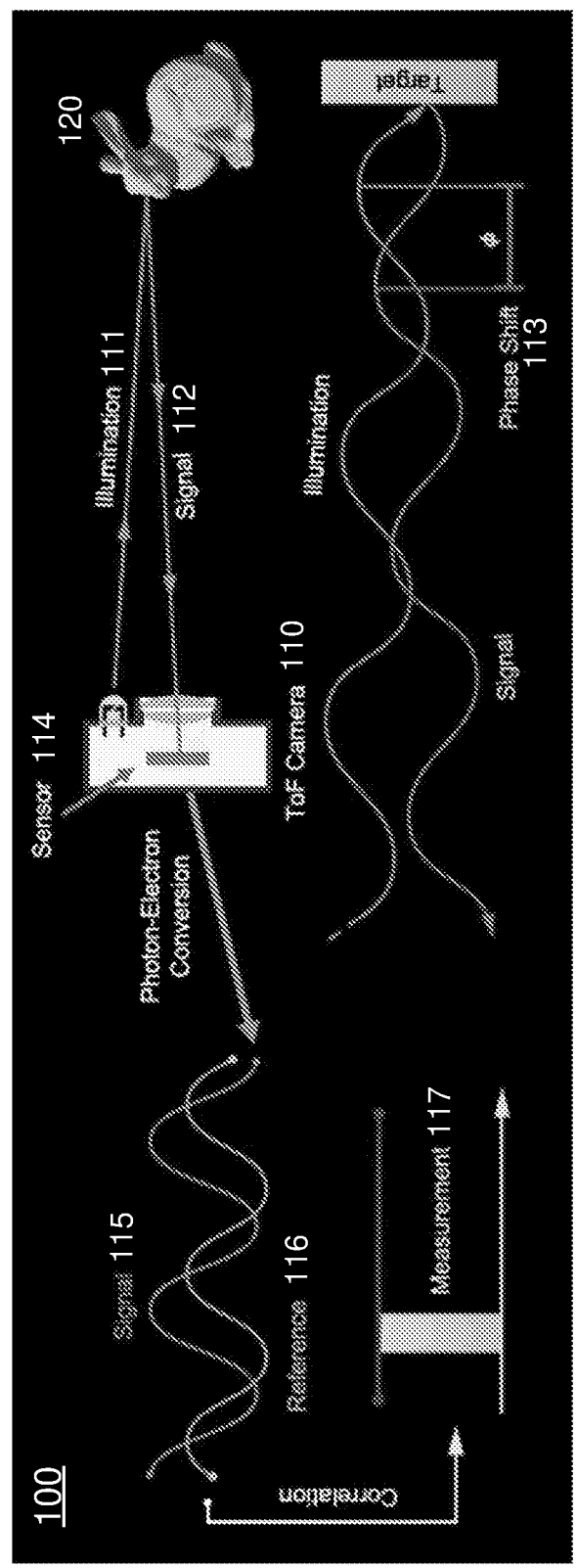
FIG. 1 illustrates a correlation imager system according to the related art.
Figure 2:
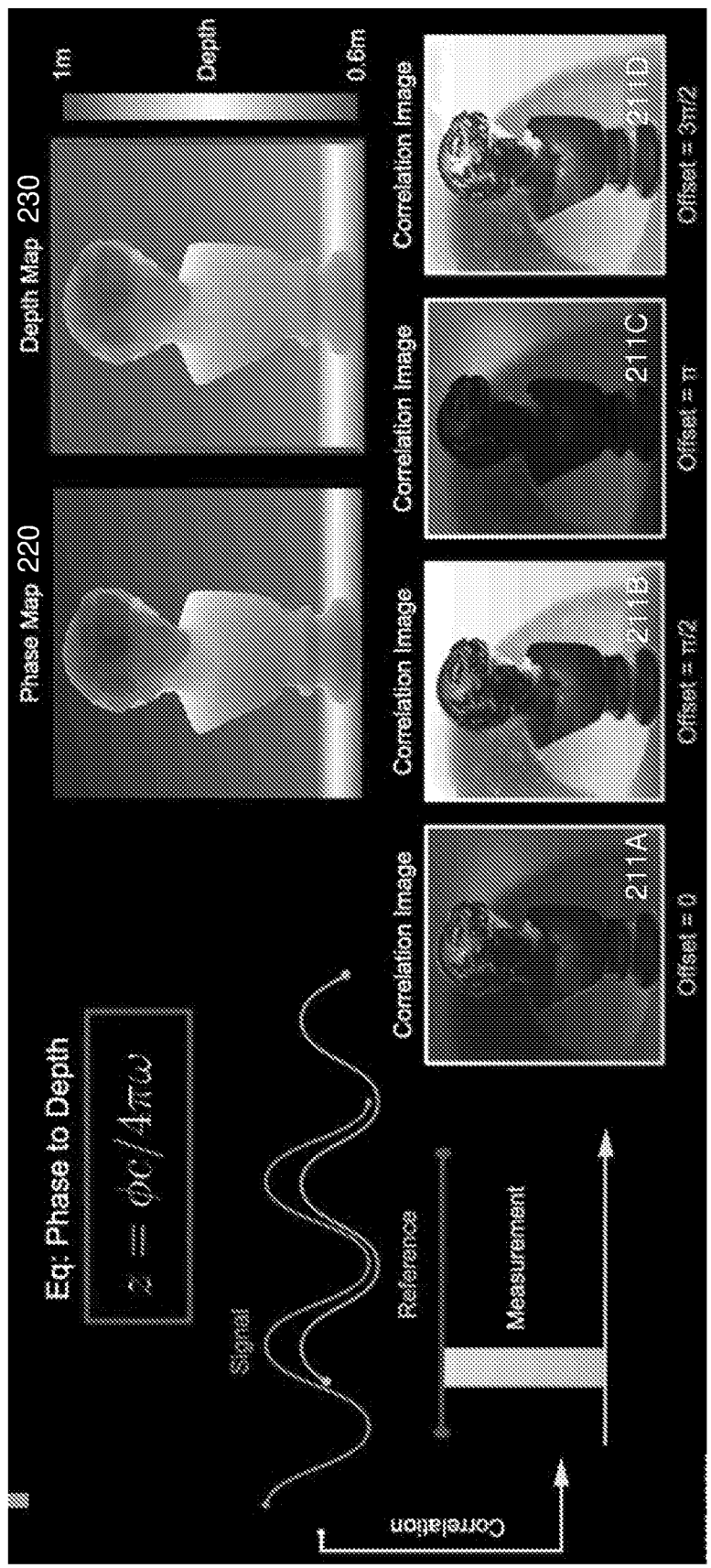
FIG. 2 illustrates the use of multiple correlation images to calculate depth according to the related art.
Figure 3:
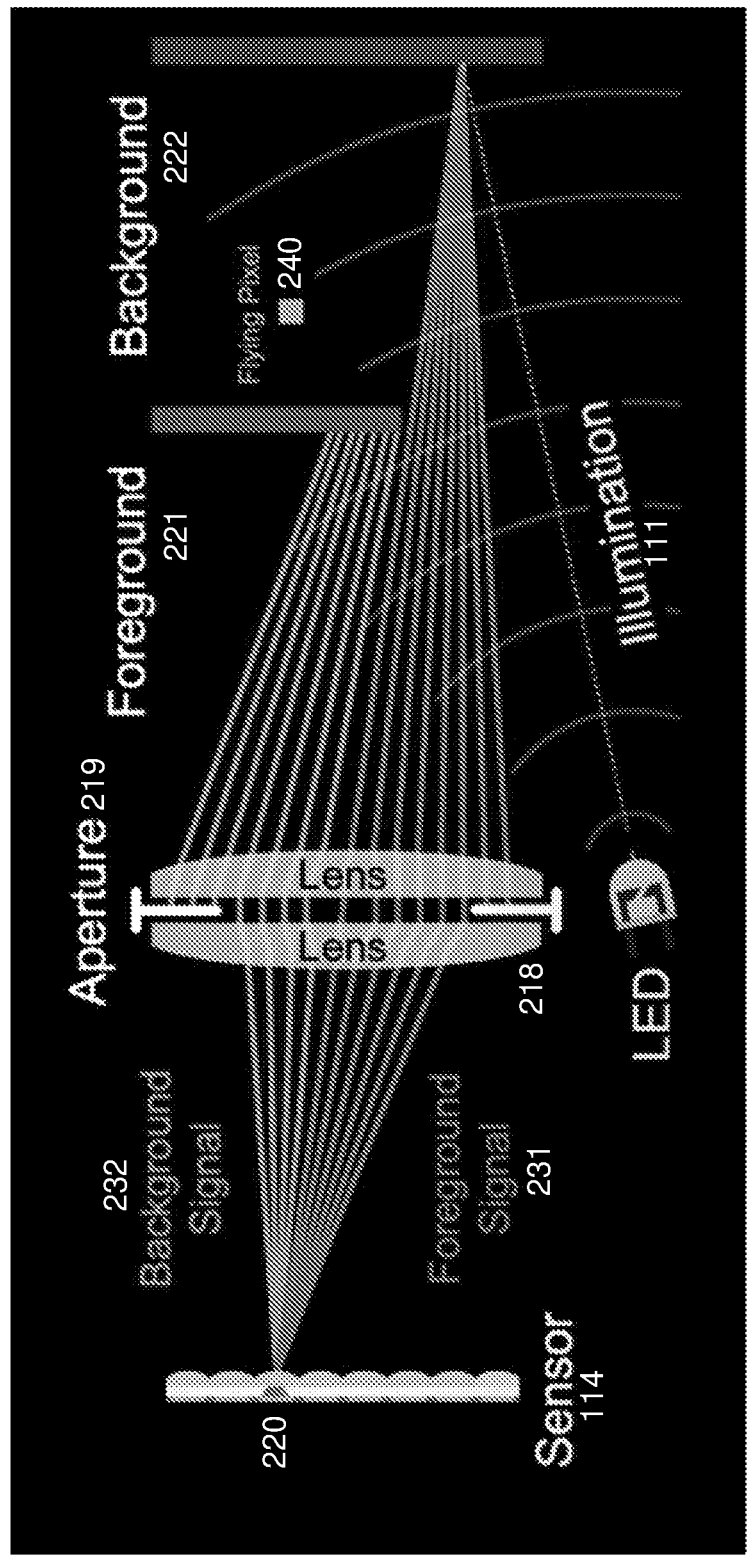
FIG. 3 illustrates the reflection of a mixed-light signal according to the related art.

With a global aperture of the related art, as illustrated in FIG. 3, all pixels are equally susceptible to flying pixels, and if one sensor pixel returns a flying pixel, likely so will its neighboring sensor pixels. Returning to the embodiments of the present invention, the addition of spatially variable susceptibility via a microlens mask, as illustrated in FIG. 4, for example, means that neighboring pixels are no longer equally susceptible to noise and/or flying pixels. A sensor pixel with a wide effective aperture can be trusted with regards to noise statistics, but is likely to return flying pixels if near an object boundary. Contrastingly, a neighboring pixel with a narrow aperture will likely produce noisier measurements, but be less affected by depth discontinuities. By aggregating information in pixel neighborhoods, wide aperture pixels can be used to de-noise local measurements, and narrow aperture pixels can be used to reduce the occurrence of flying-pixels.

Figure 9:
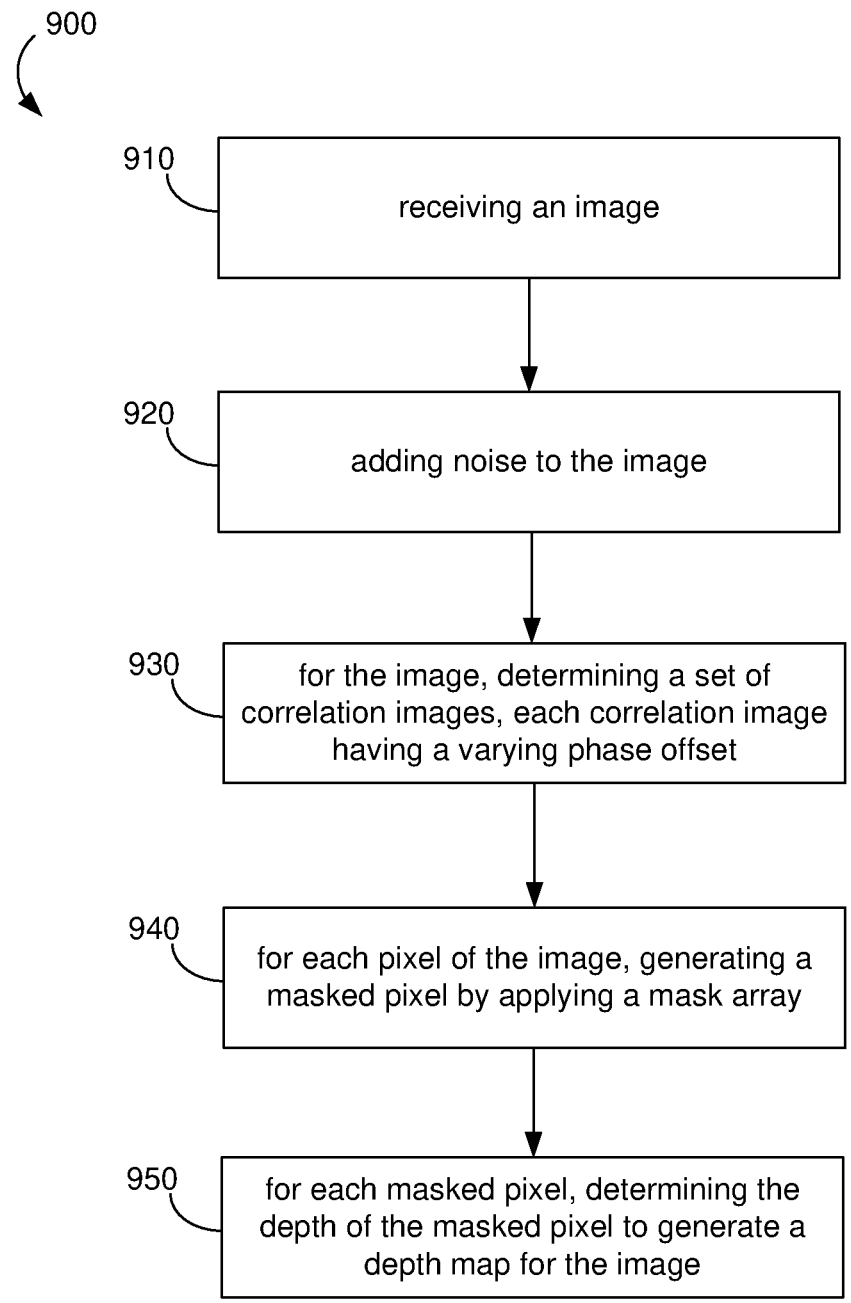
FIG. 9 illustrates a computer-implemented method for depth determination according to an example embodiment of the present invention.

FIG. 9 illustrates a computer-implemented method 900 for depth determination according to an example embodiment of the present invention. The computer-implemented method can be implemented using one or more memory devices (e.g., a non-transitory memory), one or more processing devices (e.g., a CPU, GPU, etc.), and/or one or more communication channels to transmit one or more instructions.

At 910, method 900 receives an image (e.g., an image containing a set of light field data 510 as illustrated in FIG. 5). The image may include one or more objects, one or more surfaces, and is captured by a ToF camera.

Next, at 920, method 900 adds simulated noise (e.g., noise 522 as illustrated in FIG. 5) to the image. Simulated noise is added to the image. For example, simulated noise can include noise according to a Poisson distribution or a Skellam distribution that approximates Gaussian noise.

Subsequently, for the image, method 900 generates a set of correlation images, each correlation image having a varying phase offset (e.g., correlation images 511A, 511B, 511C, 511D as illustrated in FIG. 5), at 930.

At 940, for each pixel of the image, method 900 generates a masked pixel by applying a mask array. As discussed in connection with FIG. 6, by multiplying a set of sub-aperture pixels (such as sub-aperture pixels 641-649) with a mask array (such as mask array 650, including a set of micro-lens masks 651-659) and summing the results on a per pixel basis, a masked pixel (such as masked pixel 660) is produced. Here, sub-aperture pixels 640 are weighted according to a mask array 650. The weighted sub-aperture pixels are combined with the simulated noise to produce an initial depth estimate on a per pixel basis.

Lastly, for each masked pixel, method 900 determines the depth of the masked pixel to generate a depth map for the image on a per pixel basis. Here, the respective depths of masked pixels can be determined using a convolution refinement network 770 (such as convolution refinement network 770). Alternatively, or additionally, other known depth determination techniques may be used.

In implementation, it was demonstrated that a pinhole aperture produces an extremely noisy reconstruction; an open aperture produces blurred edges with a plethora of flying pixels; and the mask pattern provides substantially improved depth determination with acceptable SNR and substantially reduced flying pixels. For real scene captures, the mask pattern achieves a 30% reduction in flying pixels as compared to an identical light throughput using a global aperture mask. In addition, the results generalize to scenes of varying geometry and surface material. Moreover, the results were achieved without re-training or fine-tuning the convolution refinement network.

The embodiments of the invention can be readily applied to numerous applications. Some non-exhaustive examples include cameras for mobile phones or tablets, autonomous vehicles, collision avoidance, delivery robotics, cartography including topography and other 3D maps, gaming, augmented reality ("AR"), virtual reality ("VR"), facial identification, and others.

It will be apparent to those skilled in the art that various modifications and variations can be made in the microlens amplitude masks for flying pixel removal in time-of-flight imaging of the present invention without departing from the spirit or scope of the invention. Thus, it is intended that the present invention cover the modifications and variations of this invention provided they come within the scope of the appended claims and their equivalents.

What is claimed is:

1. A computer-implemented method for image depth determination, the computer-implemented method comprising:
   receiving an image;
   adding noise to the image;
   for the image, determining a set of correlation images, each correlation image having a varying phase offset
   for each pixel of the image, generating a masked pixel by applying a mask array; and
   for each masked pixel, determining the depth of the masked pixel to generate a depth map for the image on a per pixel basis, wherein neighboring pixels have different apertures, wherein a first neighboring pixel has a different signal-to-noise ratio than a second neighboring pixel.

2. The computer-implemented method according to claim 1, wherein the image is captured at a sensor having a mask pattern.

3. The computer-implemented method according to claim 2, wherein the mask pattern is photolithographically applied to each pixel of the sensor.

4. The computer-implemented method according to claim 1, wherein each pixel of the image is captured using a respective aperture.

5. The computer-implemented method according to claim 1, wherein the first neighboring pixel has a different susceptibility to being a flying pixel than the second neighboring pixel.

6. The computer-implemented method according to claim 1, wherein the noise is added according to a Poisson distribution or a Skellam distribution.

7. The computer-implemented method according to claim 1, further comprising:
   processing each masked pixel by a convolution refinement network.

8. The computer-implemented method according to claim 7, wherein the convolution refinement network receives a first depth estimate for each pixel and outputs the depth for each pixel.

9. The computer-implemented method according to claim 7, wherein the convolution refinement network outputs a correction to the mask array based upon the difference between the first depth estimate for each pixel and the depth for each pixel.

10. A time-of-flight system for image depth determination, the system comprising:
    a lens configured to receive incident light and
    a light sensor having a plurality of pixels, the light sensor configured to receive the incident light through a plurality of masks, each pixel corresponding to a respective mask that selectively blocks incident light paths to provide a differentiable apertures for neighboring pixels,
    wherein a first neighboring pixel has a different signal-to-noise ratio than a second neighboring pixel.

11. The system according to claim 10, wherein the first neighboring pixel has a different susceptibility to being a flying pixel than the second neighboring pixel.

* * * * *